United States Patent [19]

Bergkvist

[11] 4,293,298
[45] Oct. 6, 1981

[54] COMBINED AIR AND FUEL NOZZLE FOR FLUIDIZED BED COMBUSTION CHAMBER

[75] Inventor: Jörgen Bergkvist, Finspong, Sweden

[73] Assignee: Stal-Laval Turbin AB, Sweden

[21] Appl. No.: 100,090

[22] Filed: Dec. 4, 1979

[30] Foreign Application Priority Data

Dec. 5, 1978 [SE] Sweden ............................... 7812481

[51] Int. Cl.³ .............................................. F27B 15/14
[52] U.S. Cl. ..................................... 432/58; 34/57 A; 239/424
[58] Field of Search .................... 432/58, 15; 110/245; 431/7, 170; 34/57 A; 239/423, 424

[56] References Cited

U.S. PATENT DOCUMENTS

| | | | |
|---|---|---|---|
| 3,552,033 | 1/1971 | Steever et al. ...................... | 34/57 A |
| 3,633,888 | 1/1972 | Kilian ................................ | 34/57 A |
| 3,861,862 | 1/1975 | Steever et al. ........................ | 432/58 |
| 3,958,916 | 5/1976 | Barker et al. ........................ | 431/170 |
| 4,021,193 | 5/1977 | Waters .................................. | 432/58 |
| 4,148,437 | 4/1979 | Barker et al. ........................ | 239/424 |
| 4,165,040 | 8/1979 | Beacham et al. .................... | 432/15 |

*Primary Examiner*—Henry C. Yuen
*Attorney, Agent, or Firm*—Pollock, Vande Sande & Priddy

[57] ABSTRACT

A combined nozzle for air and fuel to a fluidized bed (20) comprises two fixed portions (1, 10) mounted at the top and bottom of an air chamber (4) and a movable, withdrawable portion (2) which connects the two fixed portions and is guided by them. The movable portion blocks the lower fixed portion (10) outwardly and conducts air and fuel to the upper fixed portion (1). Further, there is a device (3, 26) for sealing the lower fixed portion when the movable portion is removed for inspection during operation. (FIG. 2).

6 Claims, 5 Drawing Figures

COMBINED AIR AND FUEL NOZZLE FOR FLUIDIZED BED COMBUSTION CHAMBER

TECHNICAL FIELD

The present invention relates to a combined air and fuel nozzle for introducing combustion air and fuel into a fluidized bed. The combustion chamber is provided at its bottom with fixed nozzle units, and the bottom of the air chamber is provided with sealable bushings through which replaceable cylinders with a fuel line may be inserted through the air chamber and up into the fixed nozzle units present at the bottom of the fuel chamber.

BACKGROUND ART

In fluidized bed combustion chambers removable nozzle units for fuel and combustion air typically are used to facilitate service. The nozzles operate in a high temperature, high stress environment and there is a risk of clogging of the fuel pipe, for example through carbonization of the fuel. Because the nozzle units for air and fuel are removable and the bushings therefor may be sealed during the removal, the operation of the combustion chamber may continue during the removal of an air-fuel nozzle for inspection and cleaning.

DISCLOSURE OF THE INVENTION

In contrast to known designs, the present invention comprises fixed nozzle units mounted at the bottom of the combustion chamber and closed at their tops, the nozzle units having openings in their sides at two different levels; and replaceable cylinders positioned in the operating position to project into the fixed nozzle units, the cylinders being provided with openings at three different levels. These openings are located within the air chamber below the fluidized bed and at the portion of the cylinder positioned inside the fixed nozzle unit, thereby to supply combustion air to the bed through corresponding openings in the fixed nozzle unit. Each fixed nozzle unit and its cylinder together form upper and lower annular spaces, with which the openings of the fixed nozzle unit and the cylinder communicate. The lower annular space is supplied with air through openings at one level in the wall of the cylinder; whereas, the upper annular space is supplied with air via the open upper end of the cylinder. The cylinder surrounds a fuel pipe with fuel nozzles opening out immediately opposite to the upper openings in the fixed nozzle units. The fuel is thus introduced into the fluidized bed material through the upper openings in the fixed nozzle units.

BRIEF DESCRIPTION OF THE DRAWINGS

In other respects the invention will be explained in greater detail with reference to the accompanying drawings, in which.

BEST MODE FOR CARRYING OUT THE INVENTION

Figure 1:
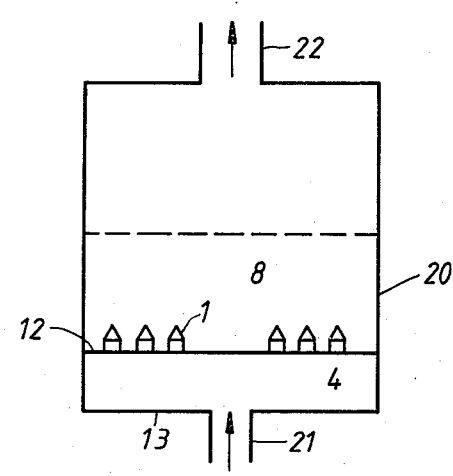
FIG. 1 shows a schematic view of a fluidized bed combustion chamber.

FIG. 1 shows a fluidized bed combustion chamber 20 having an air injection channel 21 at the bottom and a pipe 22 for the hot exhaust gases at the top. At the lower portion of the combustion chamber there is an air chamber 4 defined by the lower bottom 13 and the intermediate bottom 12. The nozzles 1 for blowing in air and fuel into the bed material 8 extend upwardly through intermediate bottom 12.

Figures 2, 3:
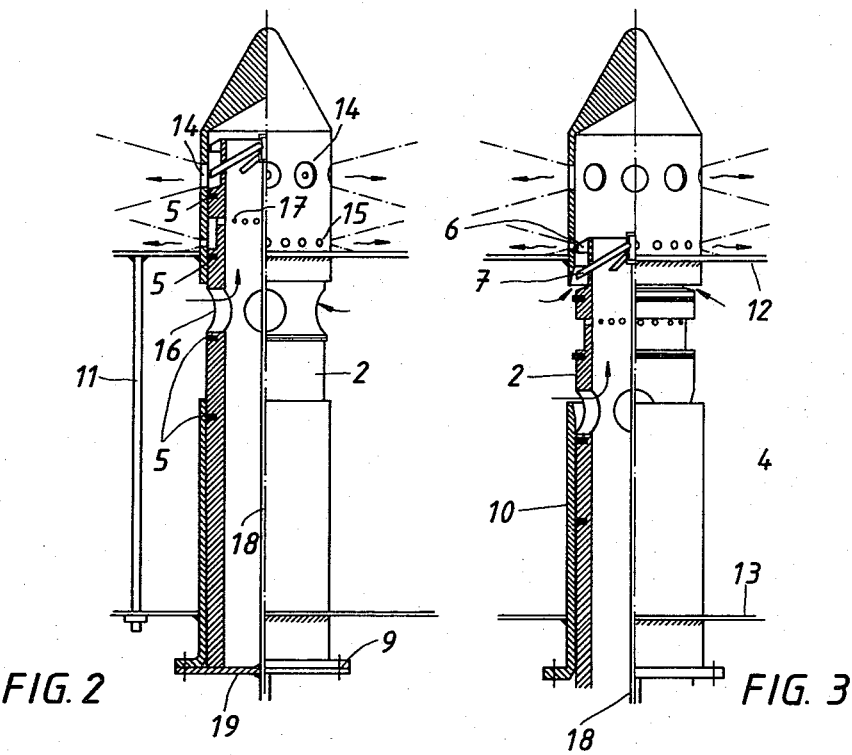
FIGS. 2 to 4 show elevation views, partially in section, of a nozzle according to the invention under various conditions of assembly and disassembly.
Figure 4:
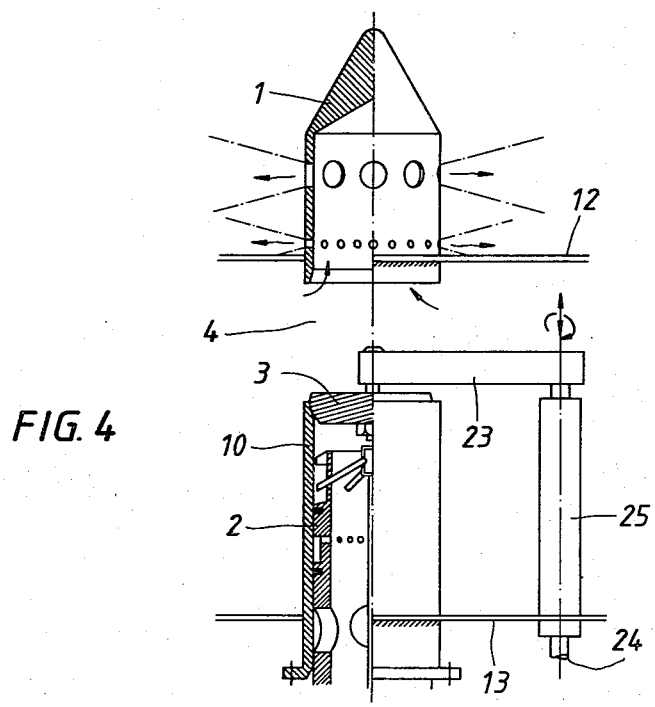

FIGS. 2–4 show the nozzles 1 according to the invention. FIG. 2 shows the nozzle in the operating position. As shown in FIG. 4, an upper fixed hood 1 is attached to the intermediate bottom 12. The hood is provided with circumferentially spaced, radially extending openings 14 and 15 at two levels, for blowing in fuel and air. An inner movable nozzle portion 2 extends upwardly into hood 1 and comprises a hollow cylinder with circumferentially spaced, radially extending openings 16 in its side wall, through which the air from the chamber 4 may pass up into the hood 1. A minor part of the air passes through circumferentially spaced, radially extending holes 17 out into the hood 1 and through holes 15 into the lowermost portion of the fluidized bed, where it ensures a good fluidization of the lowermost layer of the bed material. The remainder of the air passes over the upper edge of the open upper end of the cylinder 2, past radially extending guide pieces 6 located at the upper edge, downward and out through the openings 14 in the hood 1.

Coaxially with the cylinder 2 there is a tube 18 for liquid or gaseous fuel. Tube 18 terminates in a hollow cap or header at the top, from which obliquely downwardly directed, radial tubes 7 conduct the fuel out into the openings 14. The tubes 7 suitably terminate immediately opposite to the openings 14 where the air speed is greatest when cylinder 2 is fully inserted into hood 1, so that the fuel is well distributed in the air current before it is led out into the fluidized bed 8 proper. The air current flowing through openings 14 may be regarded as primary air and the air current through 17 and 15 may be regarded as secondary air. Further, when cylinder 2 is fully inserted into hood 1, the openings 14 and 15 in the hood 1 are located at a lower level than the corresponding openings in the cylinder 2, that is, the upper edge of the cylinder and the holes 17, respectively. In this way a baffle for the bed material is formed, thus preventing bed materials from flowing down into cylinder 2.

The cylinder 2 is guided in a bushing 10 which is welded to the lower bottom 13. The cylinder is provided with a bottom plate 19 which is screwed to a flange 9 on the bushing 10. Further, the cylinder 2 is sealed against the bushing 10 and the hood 1 by means of gaskets, suitably in the form of piston rings 5. The bottoms 12 and 13 are suitably held together by means of stays 11.

During inspection of a nozzle, the joint between flange 9 and 19 is loosened and the fuel supply to the central tube 18 is interrupted. Thereafter, the cylinder 2 may be pulled downwards, as is clear from FIGS. 3 and 4. Up to the position as shown in FIG. 4 the cylinder 2 will still close the bushing 10 so that the air chamber 4 is tightly sealed.

Before the cylinder 2 is pulled out, the bushing 10 must be sealed, which can be done as is shown in FIG. 4 by means of a plug 3. This plug is located on an arm 23 which is part of an operating member with a spindle 24 which extends through a bushing 25 at the bottom 13. The spindle 24 may be displaced axially and then turned so that the plug 3 can be operated to and from its position on top of the bushing 10. The arm 23 may possibly be so long that the plug 3 may be used alternately for several nozzles.

When the plug 3 has arrived at its position shown in FIG. 4, the cylinder 2 may be removed for inspection and cleaning, if necessary. Thereafter, it may be inserted into the bushing 10 again, the plug 3 is removed and the cylinder 2 is moved to the position shown in FIG. 2. The central tube 18 is connected to a fuel pipe. It is seen that all these steps can be taken without the operation of the combustion chamber having to be stopped.

Figure 5:
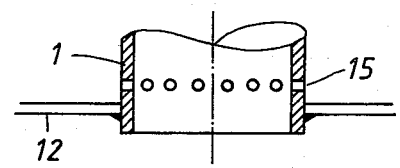
FIG. 5 shows an elevation view, partially in section, of a modified embodiment.
Figure 5:
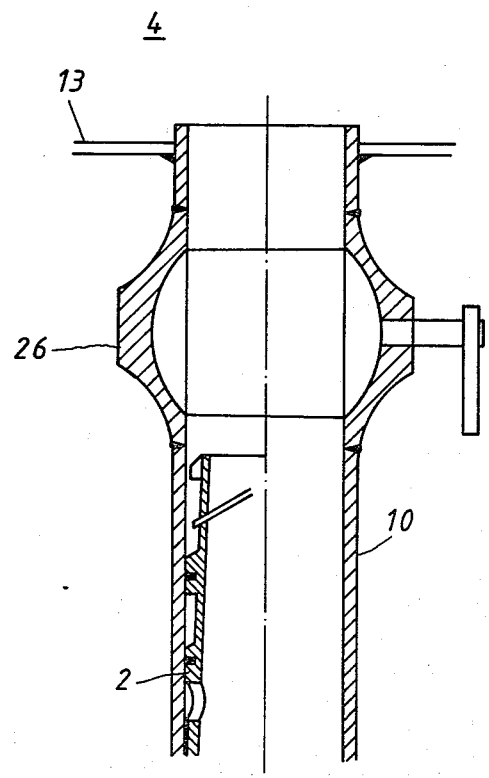

FIG. 5 shows a different embodiment of the bushing 10, in which the plug 3 according to FIG. 4 has been replaced with a ball valve 26 attached to bushing 10 and provided with an opening in the valve ball corresponding to the cylinder 2. This gives the bushing 10 a longer extension outside the air chamber 4 but the operation of the valve 26 is simpler and safer than the operation of the plug 3. Further, the bushing may have a smaller extension in the chamber 4, which can therefore be made longer.

INDUSTRIAL APPLICABILITY

The present invention is particularly adapted for air and fuel inlet nozzles of the type used in fluidized beds; however, those skilled in the art will appreciate that the principles of the invention may be applied in other applications where air and fuel mixtures or mixtures of other fluids are to be introduced into high temperature, high pressure environments.

Having described my invention in sufficient detail to enable those skilled in the art to make and use it, I claim:

1. An improved fuel and air nozzle for a fluidized bed combustion chamber of the type having an air chamber at its lower end, comprising:
    a nozzle unit fixed to extend upwardly from the air chamber into the fluidized bed, said nozzle unit being closed at its upper end and having openings through its side wall at two different levels within said fluidized bed;
    a cylinder unit passing through said air chamber and extending upwardly into said nozzle unit, said cylinder unit having openings at three different levels to permit airflow from the air chamber into said cylinder unit and from said cylinder unit through said openings in said nozzle unit;
    a fuel conduit passing through said cylinder unit; and
    means for removably sealing said cylinder unit to the bottom of the air chamber.
2. A nozzle according to claim 1, further comprising at least two annular spaces defined between said nozzle unit and said cylinder unit, into which annular spaces said openings in said nozzle unit extend.
3. A nozzle according to claim 2, wherein at least a portion of said openings in said cylinder unit extend into said annular spaces.
4. A nozzle according to claim 3, wherein one of said annular spaces is provided with air from said cylinder unit through openings in the wall of said cylinder unit and another of said annular spaces is provided with air from said cylinder unit through an open upper end of said cylinder unit.
5. A nozzle according to claim 3, wherein said fuel conduit comprises a plurality of fuel nozzles opening opposite the upper openings in said nozzle unit.
6. A nozzle according to claim 4, wherein said fuel conduit comprises a plurality of fuel nozzles opening opposite the upper openings in said nozzle unit.

* * * * *